United States Patent Office 2,763,539
Patented Sept. 18, 1956

2,763,539

METHOD AND COMPOSITION FOR THE CONTROL OF THE GROWTH OF VEGETATION

George R. McQueen, Auburn, Mich., assignor to The Dow Chemical Company, Midland, Mich., a corporation of Delaware No Drawing. Application February 1, 1955,
Serial No. 485,603

12 Claims. (Cl. 71—2.3)

This invention is concerned with the suppression of the growth of undesirable vegetation and is particularly directed to a composition and method for the control of the growth of the germinant seeds and emerging seedlings of many undesirable seed species.

It is an object of the present invention to provide a new and improved method for the suppression and control of the growth of undesirable vegetation. A further object is to provide a method for the suppression of the growth of undesirable seeds and emerging seedlings, and particularly those of small seeded grasses in soil or other growth media which is planted with the seeds of cereal grains or broadleaf crop plants or supporting the growth of established plants, plants past the seedling stage of growth. Another object is the provision of a novel composition adapted to be employed for the accomplishment of the new method of growth control. Other objects will become apparent from the following specification and claims.

According to the present invention, it has been discovered that the growth of germinant seeds and plants may be controlled by exposing the seeds or plant roots to the action of a 2,4-dinitrophenylhydrazide of a lower aliphatic acid. More particularly, it has been discovered that the growth of many germinant seeds and emerging seedlings, and especially those of small seeded grasses may be suppressed by exposing the germinant seeds and emerging seedling rootlets to the action of the above hydrazide compounds. These hydrazide compounds are crystalline solid materials characterized by the following formula

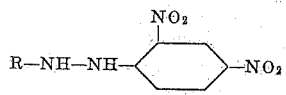

wherein R is an acyl radical containing from 1 to 5 carbon atoms, inclusive. The compounds are somewhat soluble in many organic solvents and of very low solubility in water. They have been found to have a high toxicity against the germinant seeds and emerging seedlings of many small seeded grass species. Thus, they may be employed for the selective control of the germinant seeds and emerging seedlings of small seeded grasses in growth media planted with many species of cereal grains or broadleaf crop plants or supporting the growth of such plants. Further, the hydrazide compounds have a high degree of persistency in soil and give excellent controls of small seeded grasses for periods ranging up to several months.

The introduction of the 2,4-dinitrophenylhydrazide compounds into soil or growth media gives rise to varying degrees of response in germinant seeds, emerging seedlings and growing plants depending upon the nature of the seed or plant and the dosage dispersed in the growth media, as well as the weather conditions of temperature and moisture. When very large dosages are dispersed in growth media, a temporary inhibition of seeds, seedlings and established plants is obtained. This approaches a sterilizing action. The weathering action of the sun and rain, and possibly the decomposition of the toxic compounds by the action of bacteria and other soil organisms eventually frees the growth media of the toxicants. In more dilute dosages the hydrazide compounds suppress the growth of the seeds and emerging seedlings of many small seeded grass species while having little or no effect upon the seeds and emerging seedlings of many cereal grains and broadleaf crop plants or upon the established plants of such species. Thus, it is possible to effect a selective treatment of mixed seedings of small seeded grasses and cereal grains or broadleaf crop plants. Where established crop plants are concerned, substantial amounts of the hydrazide compounds should not be applied to the plant foliage since the compounds have a tendency to burn the foliage.

The distribution of a growth inhibiting amount of the 2,4-dinitrophenylhydrazide compounds in soil is essential and critical for the practice of the present invention. In non-selective applications to growth media, good results are obtained when a dosage of toxicant is supplied in the amount of from about 8 to 300 parts or more by weight per million parts by weight of the media. In applications to soil, good results are obtained when the hydrazide compounds are distributed at a rate of from about 5 pounds to 200 pounds or more per acre and through such a cross section of the soil as to provide for the presence therein of an effective concentration of the treating agent. In such applications, it is desirable that the compounds be distributed to a depth of at least 0.5 inch and at a substantially uniform dosage of at least 1.7 pounds per acre inch of soil. In selective applications for the control of the germinant seeds and emerging seedlings of many undesirable weeds, and particularly those of small seeded grasses, in areas planted with the seeds of many cereal grains or broadleaf crop plants or supporting the growth of such plants, a dosage of from 8 to 120 parts by weight of toxicant per million parts by weight of soil may be employed. In such applications, the exact dosage to be employed is dependent upon the resistance of the cereal grain or broadleaf crop plant or their seeds to the toxicant compounds.

The method of the present invention may be carried out by applying to and mixing with growth media the unmodified hydrazide compounds. However, the present method also embraces the employment of a liquid or dust composition containing the toxicants. In such usage, the compounds may be modified with one or a plurality of additaments or herbicide adjuvants such as water, petroleum distillates or other liquid carriers; surface-active dispersing agents; and finely-divided inert solids. Depending upon the concentration of toxicant, such augmented compositions are adapted to be distributed in the soil, or employed as concentrates and subsequently diluted with additional inert carrier to produce the ultimate treating compositions. The required amount of the toxicant compounds in the growth media conveniently may be supplied per acre treated in from 40 to 27,000 gallons or more of the liquid carrier or in from about 50 to 2,000 pounds of the inert solid carrier.

The exact concentration of the hydrazide compounds to be employed in compositions for the treatment of growth media may vary provided the required dosage of effective agent is supplied. The concentration of toxicant in liquid compositions employed to supply the desired dosage generally is from about 0.001 to 50 percent by weight, although as high a concentration as 90 percent by weight may be employed. In dusts, the concentration of toxicant may be from about 1 to 20 percent by weight. In compositions to be employed as concentrates, the toxicants may be present in a concentration of from about 5 to 95 percent by weight.

Liquid compositions containing the desired amount of the hydrazide compounds may be prepared by dissolving the toxicants in an organic liquid such as acetone, xylene, or petroleum distillates, or by dispersing the toxicants in water with the aid of a suitable surface-active dispersing agent such as an ionic or non-ionic emulsifying agent. The aqueous compositions may contain one or more water-immiscible solvents for the hydrazide compounds. In such compositions, the carrier comprises an aqueous emulsion, i. e. a mixture of water-immiscible solvent, emulsifying agent and water. The choice of dispersing and emulsifying agent and the amount thereof employed is dictated by the nature of the composition type and by the ability of the agent to facilitate the dispersion of the compounds in the aqueous carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

In the preparation of dust compositions, the hydrazide compounds are dispersed in and on a finely-divided inert solid such as talc, chalk, gypsum and the like. In such operations, the carrier is mechanically ground with the compounds or wet with a volatile organic solvent solution thereof. Similarly, dust compositions containing the compounds may be prepared from various of the solid surface-active dispersing agents, such as bentonite, fuller's earth, attapulgite and other clays. Depending upon the proportions of ingredients, these dust compositions may be employed as concentrates and subsequently diluted with additional solid surface-active dispersing agent or with talc, chalk or gypsum and the like to obtain the desired amount of active ingredient in a composition adapted to be applied for the control of the growth of vegetation. Also such concentrate dust compositions may be dispersed in water with or without the aid of a dispersing agent to form spray mixtures.

When operating in accordance with the present invention, growth inhibiting amounts of the compounds or a composition containing the toxicants are dispersed in any convenient fashion in soil or other growth media, i. e. by simple mixing with the growth media, by applying to the surface of soil and thereafter dragging or discing into the soil to the desired depth, or by employing a liquid carrier to accomplish the penetration and impregnation. The application of the spray and dust compositions may be carried out by conventional methods, e. g. with power dusters, boom and hand sprayers and spray dusters.

In a further method, the distribution may be accomplished by introducing the toxicants in the water employed to irrigate the soil. In such procedure, the amount of water may be varied in accordance with the porosity and water-holding capacity of the soil in order to obtain the desired depth of distribution of the toxicants.

The following examples illustrate the invention but are not to be construed as limiting the same:

Example 1

Twenty-five parts by weight of the 2,4-dinitrophenyl-hydrazide of acetic acid, 10 parts of a dimeric alkylated aryl polyether alcohol (Triton X–155) and 65 parts of xylene were mechanically mixed together to produce a concentrate composition in the form of an emulsifiable liquid. Portions of this concentrate composition were dispersed in water to prepare aqueous emulsion compositions containing 0.22 and 0.9 pound of the hydrazide compound per 100 gallons of ultimate mixture. These compositions were employed for the treatment of areas of soil and observations made of the control of the growth of the seeds and emerging seedlings of various grass species and broadleaf crop plants. The small seeded grass species included millet, redtop, crab grass, brome grass, orchard grass, rye grass, Kentucky blue grass, canary grass and bent grass; and the broadleaf plant, navy beans; and the cereal grains, wild oats, corn and winter wheat. In the determinations, the compositions were employed to treat soil areas which had been prepared and seeded with the named plant species. In the treating operations, the compositions were applied as a soil drench and at a rate of 0.203 acre inch of composition per acre to supply substantially uniform dosages of 12.5 and 50 pounds of the 2,4-dinitrophenylhydrazide of acetic acid per acre. These dosages correspond, respectively, to concentrations of about 29.9 and 119 parts by weight of the hydrazide compound per million parts by weight of soil. Other areas similarly seeded with the named plant species were left untreated to serve as checks. After three weeks the treated areas were examined to ascertain the control of the growth of the seeds and emerging seedlings. The results are set forth in the following table:

| Seed Species | Percent Control of Growth of Seed and Emerging Seedlings at the Various Indicated Dosages of Toxicant in Pounds per Acre | |
|---|---|---|
| | 12.5 | 50 |
| German millet | 100 | 100 |
| Japanese millet | 100 | 100 |
| red top | 100 | 100 |
| crab grass | 100 | 100 |
| brome grass | 90 | 90 |
| orchard grass | 90 | 100 |
| rye grass | 90 | 100 |
| Kentucky blue grass | 100 | 100 |
| canary grass | 100 | 100 |
| bent grass | 80 | 95 |
| wild oats | 0 | 0 |
| corn | 0 | 0 |
| winter wheat | 0 | 20 |
| navy beans | 0 | 0 |

At the time of observation, the check areas were found to show luxuriant and vigorously growing stands of the named plant species.

Example 2

Twenty-five parts by weight of the 2,4-dinitrophenyl-hydrazide of formic acid, 10 parts of Triton X-155 and 65 parts of xylene were mechanically mixed to produce a concentrate composition in the form of an emulsifiable liquid. Portions of this concentrate composition were dispersed in water to prepare aqueous emulsion compositions containing 0.22 and 0.9 pound of the hydrazide compound per 100 gallons of ultimate mixture. These compositions were employed as described in Example 1 for the control of the growth of the germinant seeds and emerging seedlings of several grass species and broadleaf crop plants. The results are set forth in the following table:

| Seed Species | Percent Control of Growth of Seeds and Emerging Seedlings at the Various Indicated Dosages of Toxicant in Pounds per Acre | |
|---|---|---|
| | 12.5 | 50 |
| German millet | 100 | 100 |
| Japanese millet | 100 | 100 |
| red top | 95 | 100 |
| crab grass | 100 | 100 |
| orchard grass | 90 | 100 |
| rye grass | 60 | 95 |
| Kentucky blue grass | 90 | 90 |
| canary grass | 100 | 99 |
| bent grass | 90 | 95 |
| wild oats | 0 | 20 |
| corn | 0 | 0 |
| winter wheat | 0 | 20 |
| navy beans | 0 | 40 |
| soy beans | 0 | 0 |
| cotton | 0 | 100 |

Substantially complete germination and luxuriant growth of all seed and plant species were found in the check areas.

Example 3

Twenty-five parts by weight of the 2,4-dinitrophenylhydrazide of propionic acid, 10 parts of Triton X-155 and 65 parts of xylene are mixed together to prepare a concentrate composition in the form of an emulsifiable liquid.

Also, 25 parts by weight of the 2,4-dinitrophenylhydrazide of acetic acid, 72 parts of diatomaceous earth, and 2 parts of an alkyl aryl sulfonate (Nacconal NR) and 2 parts of a polymerized sodium salt of a substituted benzoic alkyl sulfonic acid (Daxad No. 27) are mechanically mixed and ground together to prepare a concentrate composition in the form of a wettable powder.

In a similar manner, 20 parts by weight of the 2,4-dinitrophenylhydrazide of isovaleric acid, 0.1 part of Nacconal NR, and 0.1 part of Daxad No. 27 and 200 parts of water are ball milled together to prepare a water dispersible concentrate composition in the form of a liquid emulsion.

These concentrate compositions are adapted to be dispersed in water to prepare aqueous compositions which have very desirable wetting and penetrating properties. The latter aqueous compositions are adapted to be employed to treat soil and distribute the hydrazide compounds therein in growth inhibiting concentrations.

Example 4

Emulsifiable concentrate compositions containing 25 parts by weight of the 2,4-dinitrophenylhydrazide of butyric acid and of the 2,4-dinitrophenylhydrazide of isobutyric acid were prepared in the manner as described in Examples 1 and 2. Portions of these concentrates were dispersed in water to prepare aqueous compositions containing 0.22 and 0.9 pound of one of the hydrazide compounds per 100 gallons of ultimate mixture. These compositions were employed as described in Example 1 for the control of the growth of the germinant seeds and emerging seedlings of several grass species and broadleaf crop plants. The results are set forth in the following table:

| Seed Species | Percent Control of Growth of Seeds and Emerging Seedlings at the Various Indicated Dosages of Toxicant in Pounds per Acre | | | |
|---|---|---|---|---|
| | 2,4-Dinitrophenyl hydrazide of Isobutyric Acid | | 2,4-Dinitrophenyl hydrazide of Butyric Acid | |
| | 12.5 | 50 | 12.5 | 50 |
| German millet | 95 | 100 | 100 | 100 |
| Japanese millet | 97 | 100 | 100 | 100 |
| red top | 97 | 100 | 100 | 90 |
| crab grass | 97 | 100 | 100 | 100 |
| orchard grass | | | 80 | 95 |
| rye grass | | | 70 | 90 |
| Kentucky blue grass | | | 70 | 90 |
| Canary grass | 80 | 95 | 80 | 95 |
| bent grass | 90 | 99 | 100 | 90 |
| wild oats | 0 | 0 | | |
| corn | 0 | 0 | 0 | 0 |
| winter wheat | 0 | 0 | 30 | 10 |
| navy beans | 0 | | 0 | 0 |
| cotton | | | 0 | 0 |
| soy beans | | | 0 | 0 |

At the time of observation the check plots contained vigorously growing stands of the named plant species.

Example 5

Portions of the emulsifiable concentrate compositions as prepared in Example 4 were dispersed in water to produce aqueous compositions containing 0.04 pounds of one of the hydrazide compounds per 100 gallons of ultimate mixture. These compositions were employed for the treatment of soil areas which has been prepared and seeded to Japanese millet and radish. In the treating operations, the compositions were applied to the soil areas as a soil drench and at a rate of about 0.44 acre inch of aqueous composition per acre to supply substantially uniform dosages of 50 pounds of one of the toxicant compounds per acre. This dosage corresponds to a concentration of about 82 parts by weight of toxicant compound per million parts by weight of soil. Other areas similarly prepared and seeded were left untreated to serve as checks.

After three weeks the treated and untreated areas were examined to ascertain what control of growth of seeds and emerging seedlings had been obtained. It was found that the treatment with the hydrazide compositions gave a 100 percent control of the growth of the germinant seeds and emerging seedlings of millet and had no effect upon the germination of the seeds and growth of the seedlings of radish. At the time of observation vigorously growing stands of millet and radish were found in the check areas.

Example 6

A portion of the emulsifiable concentrate composition of Example 1 was dispersed in water to prepare an aqueous spray composition containing 3.32 pounds of the 2,4-dinitrophenylhydrazide of acetic acid per 100 gallons of ultimate mixture. This composition was applied to the foliage of corn and tomato plants in the seedling stage of growth. At the time of application the plants were about four inches tall. In the treating operations, the foliage and stems of the plants were thoroughly wet with the composition. Other tomato and corn plants in the same stage of growth were left untreated to serve as checks. Two weeks following the applications, the treated plants were examined for evidence of burned foliage attributable to the 2,4-dinitrophenylhydrazide of acetic acid. From the examination it was found that the plants showed no foliage damage attributable to the treatment with the hydrazide compound and were of the same size and maturity as the untreated checks.

The expression "growth media" is employed in the present specification and claims in its broadest sense to be inclusive of all conventional "soils," as defined in Webster's New International Dictionary, second edition, unabridged, published in 1937 by G. and C. Merriam Company, Springfield, Massachusetts. Thus, the term refers to any substances or media in which vegetation may take root and grow, and is intended to include not only earth but compost, manure, muck, humus, and sand and the like, adapted to support plant growth.

The expression "surface-active dispersing agent" as herein employed is intended to include all agents which are capable of acting at the interfacial surface between the 2,4-dinitrophenylhydrazides and water as the dispersion medium, so as to facilitate the dispersion of the compounds in water. Thus, the term is inclusive of the solid emulsifying agents such as finely-divided aluminum hydroxide and finely-divided bentonite, fuller's earth, attapulgite and other clays, as well as the ionic and non-ionic wetting and emulsifying agents such as the alkaline earth metal caseinates, alkyl aryl sulfonates, sulfonated oils, complex organic ester derivatives, complex ether alcohols, and the like.

The term "finely-divided inert solid" as herein employed refers to materials which are incapable of facilitating the dispersion of the water-insoluble 2,4-dinitrophenylhydrazides in water as the dispersion medium and is intended to include finely-divided materials such as chalk, talc, gypsum and the like.

The 2,4-dinitrophenylhydrazides of the lower aliphatic acids as employed in the present invention may be prepared by reacting 2,4-dinitrophenylhydrazine with a lower aliphatic acid. In carrying out the reaction, substantially equimolecular proportions of the reagents are mixed together in an excess of the aliphatic acid reagent as reaction solvent and the resulting mixture heated for a period of time at the boiling temperature and under reflux.

Upon completion of the reaction, the reaction mixture is diluted with excess water. During the latter dilution, the desired hydrazide product precipitates in the mixture as a crystalline solid. The latter may be separated by filtration and purified by recrystallization from an organic solvent such as ethylene dichloride.

I claim:
1. A method which comprises applying to and mixing with a growth medium a growth inhibiting amount of a 2,4-dinitrophenylhydrazide of a lower aliphatic acid.
2. A method which comprises impregnating soil with a 2,4-dinitrophenylhydrazide of a lower aliphatic acid in the amount of at least 8 parts by weight per million parts by weight of soil.
3. A method which comprises impregnating soil with a composition comprising a 2,4-dinitrophenylhydrazide of a lower aliphatic acid as an active ingredient in intimate admixture with an inert herbicide adjuvant as a carrier therefor, the impregnation being carried out so as to provide at least 8 parts by weight of the active agent per million parts by weight of soil.
4. A method for the selective control of the germinant seeds and emerging seedlings of small seeded grasses in soil planted with cereal grains or broadleaf crop plants, which comprises distributing a 2,4-dinitrophenylhydrazide of a lower aliphatic acid in such soil in the amount of from 8 to 120 parts by weight per million parts by weight of the soil.
5. A method for the selective control of the germinant seeds and emerging seedlings of small seeded grasses in soil planted with corn, which comprises distributing a 2,4-dinitrophenylhydrazide of a lower aliphatic acid in such soil in the amount of from 8 to 120 parts by weight per million parts by weight of the soil.
6. A method which comprises impregnating soil with the 2,4-dinitrophenylhydrazide of formic acid in the amount of at least 8 parts by weight per million parts by weight of the soil.
7. A method which comprises impregnating soil with the 2,4-dinitrophenylhydrazide of acetic acid in the amount of at least 8 parts by weight per million parts by weight of the soil.
8. A method which comprises impregnating soil with the 2,4-dinitrophenylhydrazide of butyric acid in the amount of at least 8 parts by weight per million parts by weight of the soil.
9. A concentrate composition which comprises a 2,4-dinitrophenylhydrazide of a lower aliphatic acid as an active toxic ingredient in intimate admixture with a surface-active dispersing agent, the active ingredient being present in the amount of from 5 to 95 percent by weight.
10. A composition for the suppression of the growth of vegetation which comprises an aqueous dispersion of the composition claimed in claim 9, the active toxic ingredient being present in the amount of at least 0.001 percent by weight.
11. A method for the selective control of the germinant seeds and emerging seedlings of small seeded grasses in soil planted with corn, which comprises distributing the 2,4-dinitrophenylhyrazide of acetic acid in such soil in the amount of from 8 to 120 part by weight per million parts by weight of the soil.
12. The concentrate composition which comprises a 2,4-dinitrophenylhydrazide of a lower aliphatic acid as an active toxic ingredient in intimate admixture with a finely divided inert solid, the active ingredient being present in the amount of from 5 to 95 percent by weight.

References Cited in the file of this patent

FOREIGN PATENTS 885,341     France _____ Sept. 10, 1943

OTHER REFERENCES

Chemical Abstracts, vol. 29 (1935), col. 29325, abstract of article by Cerezo et al.

Chemical Abstracts, vol. 43 (1949), col. 5525i, abstract of U. S. Dept. of Agriculture publication.